(12) United States Patent
Coldicott et al.

(10) Patent No.: US 8,589,439 B2
(45) Date of Patent: Nov. 19, 2013

(54) PATTERN-BASED AND RULE-BASED DATA ARCHIVE MANAGER

(75) Inventors: Peter A. Coldicott, Austin, TX (US); Mei Y. Selvage, Pocatello, ID (US); Xiao Fend Tao, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 213 days.

(21) Appl. No.: 12/630,997

(22) Filed: Dec. 4, 2009

(65) Prior Publication Data
US 2011/0137871 A1 Jun. 9, 2011

(51) Int. Cl.
*G06F 7/00* (2006.01)

(52) U.S. Cl.
USPC .......................................... 707/783

(58) Field of Classification Search
USPC .......................... 707/783, 758, 611
See application file for complete search history.

(56) References Cited

U.S. PATENT DOCUMENTS

| 8,260,813 | B2 | 9/2012 | Coldicott et al. | |
|---|---|---|---|---|
| 2002/0138301 | A1 | 9/2002 | Karras et al. | |
| 2003/0193994 | A1 | 10/2003 | Stickler | |
| 2004/0015890 | A1 | 1/2004 | Wong et al. | |
| 2004/0096729 | A1 | 5/2004 | Tanaka et al. | |
| 2006/0009942 | A1 | 1/2006 | Keck et al. | |
| 2006/0143231 | A1* | 6/2006 | Boccasam et al. | 707/104.1 |
| 2006/0167929 | A1 | 7/2006 | Chakraborty et al. | |
| 2007/0276883 | A1* | 11/2007 | Kumar et al. | 707/204 |
| 2007/0283417 | A1 | 12/2007 | Smolen et al. | |
| 2008/0263007 | A1 | 10/2008 | Schmidt | |
| 2008/0275829 | A1* | 11/2008 | Stull et al. | 706/17 |
| 2009/0249290 | A1 | 10/2009 | Jenkins et al. | |
| 2010/0070538 | A1* | 3/2010 | Spinelli et al. | 707/802 |
| 2011/0137869 | A1 | 6/2011 | Coldicott et al. | |
| 2011/0137872 | A1 | 6/2011 | Coldicott et al. | |

FOREIGN PATENT DOCUMENTS

WO 2010068443 4/2009

OTHER PUBLICATIONS

"Reference Model for an Open Archival Information System (OAIS)", Consultative Committee for Space Data Systems, CCSDS 650.0-B-1, Blue Book, Issue 1, Jan. 2002, 148 pages.
International Search Report and Written Opinion for International Application No. PCT/EP2010/068443 dated Mar. 21, 2011.
Smith et al., "Creating Preservation-Ready Web Resources", D-Lib Magazine, ISSN 1082-9873, Jan./Feb. 2008, vol. 14, No. 12, 11 pages.
Fraternali et al., "Model-Driven Development of Web Applications: The Autoweb System", ACM Transactions on Information Systems, vol. 28, No. 4, Oct. 2000, pp. 323-382.

(Continued)

*Primary Examiner* — Truong Vo
(74) *Attorney, Agent, or Firm* — Mark C. Vallone; Keohane & D'Alessandro, PLLC (57) ABSTRACT

The present invention relates to a method or system of data archival using a pattern-based and rule-based data archive manager for a flexible, generic archive solution. The method and system allow for the user to create rules and allow for the system to archive based upon those rules input by the user and to select data to be archived against the facts about the data. The system has a rule based data archive manager having a pattern matcher, a decision scheduler and a rule executor, a fact meta-data storage for storing facts, and a rule library storage for storing user input data about rules.

14 Claims, 6 Drawing Sheets

(56) References Cited

OTHER PUBLICATIONS

Chen et al., "A Semantic Web Service Based Approach for Augmented Provenance", Proceedings of the 2006 IEEE/WC/ACM International Conference on Web Intelligence.

Yusuf et al., "Implement model-driven development to increase the business value of your IT system", Jan. 24, 2006, http://www.ibm.com/developerworks/library/ar-mdd1/.

Lawson, "DB2 Data—Test Data Generation and Archiving: Two Underappreciated Arts", ftpftp://ftp.software.ibm.com/software/data/db2imstools/whitepapers/lawson-testarchiving-reoprt.pdf.

Final Office Action dated Jan. 30, 2012 for U.S. Appl. No. 12/631,088, filed Dec. 4, 2009.

Final Office Action dated Oct. 19, 2011 for U.S. Appl. No. 12/631,014, filed Dec. 4, 2009.

Truong V. Vo, USPTO Office Action, U.S. Appl. No. 12/631,014, Mail Date Jan. 27, 2012, 11 pages.

Truong V. Vo, USPTO Office Action, U.S. Appl. No. 12/631,014, Mail Date Apr. 16, 2012, 9 pages.

Truong V. Vo, USPTO Office Action, U.S. Appl. No. 12/631,014, Mail Date Jul. 20, 2012, 17 pages.

Truong V. Vo, USPTO Office Action, U.S. Appl. No. 12/631,088, Mail Date Oct. 20, 2011, 18 pages.

Truong V. Vo, USPTO Office Action, U.S. Appl. No. 12/631,088, Mail Date Jan. 30, 2012, 13 pages.

* cited by examiner

Figure 6 – Sample generated data archive specification model

PATTERN-BASED AND RULE-BASED DATA ARCHIVE MANAGER

FIELD OF THE INVENTION

The present invention relates to a method or system of data archival using a pattern-based and rule-based data archive manager for a flexible, generic archive solution. It provides a data archiving solution by using a pattern-based and rule-based data archive manager for a flexible, generic archive solution. The method and system allow for the user to create rules and allow for the system to archive based upon those rules input by the user and to select data to be archived against the facts about the data. The system has a rule based data archive manager having a pattern matcher, a decision scheduler and a rule executor, a fact meta-data storage for storing facts, and a rule library storage for storing user input data about rules.

BACKGROUND OF THE INVENTION

Data archives create huge challenges to enterprises. Regulations such as Sarbanes-Oxley and HIPAA mandate enterprises proactively manage the end-to-end data life cycle from data creation to archive. The Sarbanes-Oxley Act of 2002, also known as the "Public Company Accounting Reform and Investor Protection Act" (in the Senate) and "Corporate and Auditing Accountability and Responsibility Act" (in the House) and commonly called Sarbanes-Oxley, Sarbox or SOX, is a United States federal law enacted on Jul. 30, 2002, as a reaction to a number of major corporate and accounting scandals including those affecting Enron, Tyco International, Adelphia, Peregrine Systems and WorldCom. The Health Insurance Portability and Accountability Act (HIPAA) was enacted by the U.S. Congress in 1996. According to the Centers for Medicare and Medicaid Services (CMS) website, Title I of HIPAA protects health insurance coverage for workers and their families when they change or lose their jobs. Today, there are certain data archive tools that define data storage management backup policies. They are coarse-grained and fixed rules, e.g., what is the storage pool target, what to do if file is in use, how long to keep backup versions and archive copies. These rules are pre-defined and cannot be customized. Current data archive solutions are not flexible enough to fulfill a variety of data archive requirements.

One of the primary methods to archive data is for a user to select, move and remove data manually. For instance, database administrators may issue SQL queries. (Structured Query Language is a database computer language designed for managing data in relational database management systems (RDBMS) or use generic database utilities to search and select against relational databases and save the result as files, and then send via FTP to another location. (File Transfer Protocol (FTP) is a standard network protocol used to exchange and manipulate files over a TCP/IP based network, such as the Internet.)) This method may be simple and doesn't create large, upfront cost, but it has disadvantages. Specifically, it creates high risk of archiving the wrong data or not archiving enough data and frequently leads to data integrity issues, so the manual archive method is of potential damage to an enterprise and even result in an enterprise disaster.

Other data archive technologies usually provide a configurable console and programmable tool for data archive. However, these products also have limitations:

These tools may have limited data source and location support. Most of these tools may only support specific relational databases (such as IBM® DB2®, Oracle, etc.), and just archive to tables or flat files. (DB2 is one of the families of relational database management system (RDBMS) software products within IBM's broader Information Management Software line. DB2 is a registered trademark of International Business Machines Corporation. The Oracle Database (commonly referred to as Oracle RDBMS or simply Oracle) consists of a RDBMS produced and marketed by Oracle Corporation. Oracle® is a registered trademark of Oracle Corporation.).

These tools may have limited data type support. Most of them only support common data types in relational database.

Some archive tools may just simply copy documents (files) just like a backup system, never consider business logic.

These tools may not be flexible enough to change archive rules.

None of the prior art systems use model-driven development (MDD) to model data archive specifications, then transform specifications into executable code.

A rule-based approach has proven itself as an effective way to deal with the problems resulting from frequent changes businesses need to comply with. The approach has been leveraged at the generic data archive framework for data archive business rules definition, which makes the framework more flexible and adaptive to various requirements.

Therefore, there is a need to solve the problems associated with data archive technology as described above.

SUMMARY OF THE INVENTION

The present invention provides a system and at least one method for data archiving. It provides a method and system of data archival using a pattern-based and rule-based data archive manager for a flexible, generic archive solution. The method and system allow for a user to create rules and allow for the system to archive based upon those rules input by the user and to select data to be archived against the facts about the data. The system may have a rule based data archive manager having a pattern matcher, a decision scheduler and a rule executor, a fact meta-data storage for storing facts, and a rule library storage for storing user input data about rules.

The data archival system of the present invention provides for the operation of moving data from original data repository into archive data repository. The present invention helps enterprise applications define and implement a flexible data archive flow though dynamic configuration. The rule mechanism is taken into consideration and designed into data archive meta-model, as key elements of the meta-model, things like "archive conditions", "schedule", "Evaluation", "Expression", etc., therefore it's more flexible. The present invention defines when and how to archive the data, what the business rules are. It is much more fine grained. It offers a comprehensive solution to allow end users to specify fine-grained, business-rule driven and flexible rules.

The present invention may include a method for flexible data archival using a model-driven approach in a system having a data archive engine, a rule based data archive manager having a pattern matcher, a decision scheduler and a rule executor, a fact meta-data storage and a rule library storage, the method having such steps as selecting rules based upon input data from the rule library storage, routing the rules to the decision scheduler, submitting the rules to the rule executor, and archiving data archive tasks based upon the rules.

A computer system of the present invention for flexible data archival using a rule-driven approach may have a rule based data archive manager having program instructions for archiving data based upon data, a pattern matcher having program instructions for matching patterns, a decision scheduler having program instructions for scheduling decisions, a rule executor having program instructions for executing rules, a fact meta-data storage having storage and program instructions for storing facts and a rule library storage having storage and program instructions for storing user input data about rules.

The present invention may comprise a computer program product for implementing a method in a system for flexible data archival, the computer program product comprising a computer readable storage media, program instructions to select rules based upon input data from the rule library storage, program instructions to route the rules to a decision scheduler, program instructions to submit the rules to a rule executor and program instructions to archive data archive tasks based upon the rules, and wherein the program instructions are stored on the computer readable storage media.

One other aspect of the present invention may be a method for deploying a computing infrastructure comprising integrating computer-readable code into a computing system, wherein the code in combination with the computing system is capable of performing a process for archiving data, the process may have the steps of selecting rules based upon input data from the rule library storage, routing the rules to the decision scheduler, submitting the rules to the rule executor and archiving data archive tasks based upon the rules.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention.

DETAILED DESCRIPTION OF THE INVENTION

The present invention comprises a system and method for archiving data. The system and method of the present invention consider data archiving on enterprise business objects level, not on database records, tables and files level. Data archiving is business-oriented and different enterprise applications have different data archive rules. It is very important to have a flexible, generic end-to-end data archive solution that is business-oriented, independent from individual applications, databases and systems.

Some of the advantages of using the system and method of the present invention are the following. It allows for a user to create rules and allow for the system to archive based upon those rules input by the user and to select data to be archived against the facts about the data. The system may have a rule based data archive manager having a pattern matcher, a decision scheduler and a rule executor, a fact meta-data storage for storing facts, and a rule library storage for storing user input data about rules.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable storage medium(s) having computer readable program code embodied thereon.

Any combination of one or more computer readable storage medium(s) may be utilized. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium would include the following: a portable computer diskette; a hard disk; a random access memory (RAM); a read-only memory (ROM); an erasable programmable read-only memory (EPROM or Flash memory); a portable compact disc read-only memory (CD-ROM); an optical storage device, a magnetic storage device; or any suitable combination of the foregoing. In the context of this document, a computer readable storage medium may be any tangible medium that can store a program for use by or in connection with an instruction execution system, apparatus, or device.

Program code embodied on a computer readable storage medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. Java is a registered trademark of Sun Microsystems. Smalltalk is an object-oriented, dynamically typed, reflective programming language. C++ is a statically typed, free-form, multi-paradigm, compiled, general-purpose programming language. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
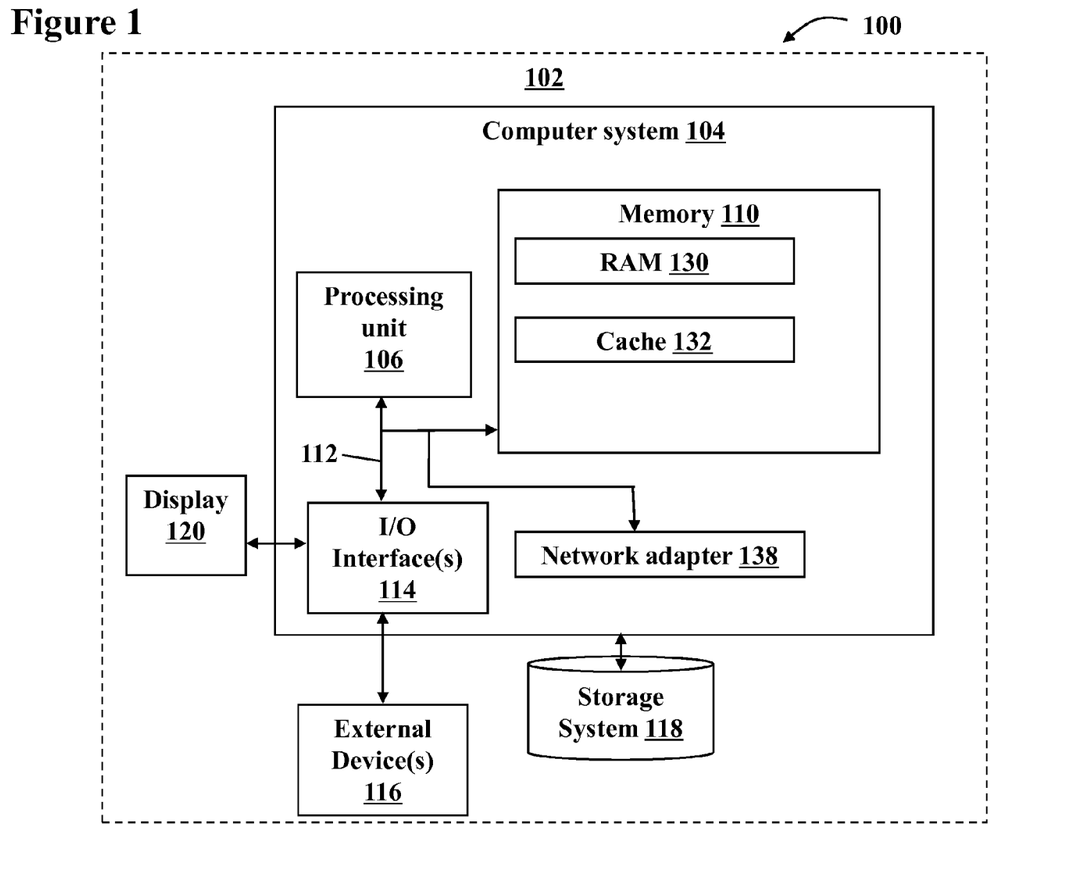
FIG. 1 shows a data processing system suitable for implementing an embodiment of the present invention.

FIG. 1 shows a system 100 that may have a data processing system 102 suitable for implementing an embodiment of the present invention. Data processing system 102 may have a computer system 104 connected to a display 120, external device(s) 116 or other peripheral devices for providing a user an interface to computer system 104 being connected via I/O interface(s) 114. Computer system 104 may have an internal bus 112 for providing internal communication between such modules as processing unit 106, I/O interface(s) 114, network adapter 138 and memory 110. Memory 110 may have random access memory (RAM) 130, cache 132 and storage system 118 or other forms of memory. RAM may take the form of integrated circuits that allow stored data to be accessed in any order, that is, at random. Storage system 118 may take the form of tapes, magnetic discs and optical discs and are generally used for long term storage of data. Cache 132 is a memory for storing a collection of data—duplicating original values stored elsewhere or computed earlier, where the original data is expensive to fetch (owing to longer access time) or to compute, compared to the cost of reading the cache. In other words, a cache is a temporary storage area where frequently accessed data can be stored for rapid access. Once the data is stored in the cache, it can be used in the future by accessing the cached copy rather than re-fetching or re-computing the original data. A cache has proven to be extremely effective in many areas of computing because access patterns in typical computer applications have locality of reference.

Figure 2:
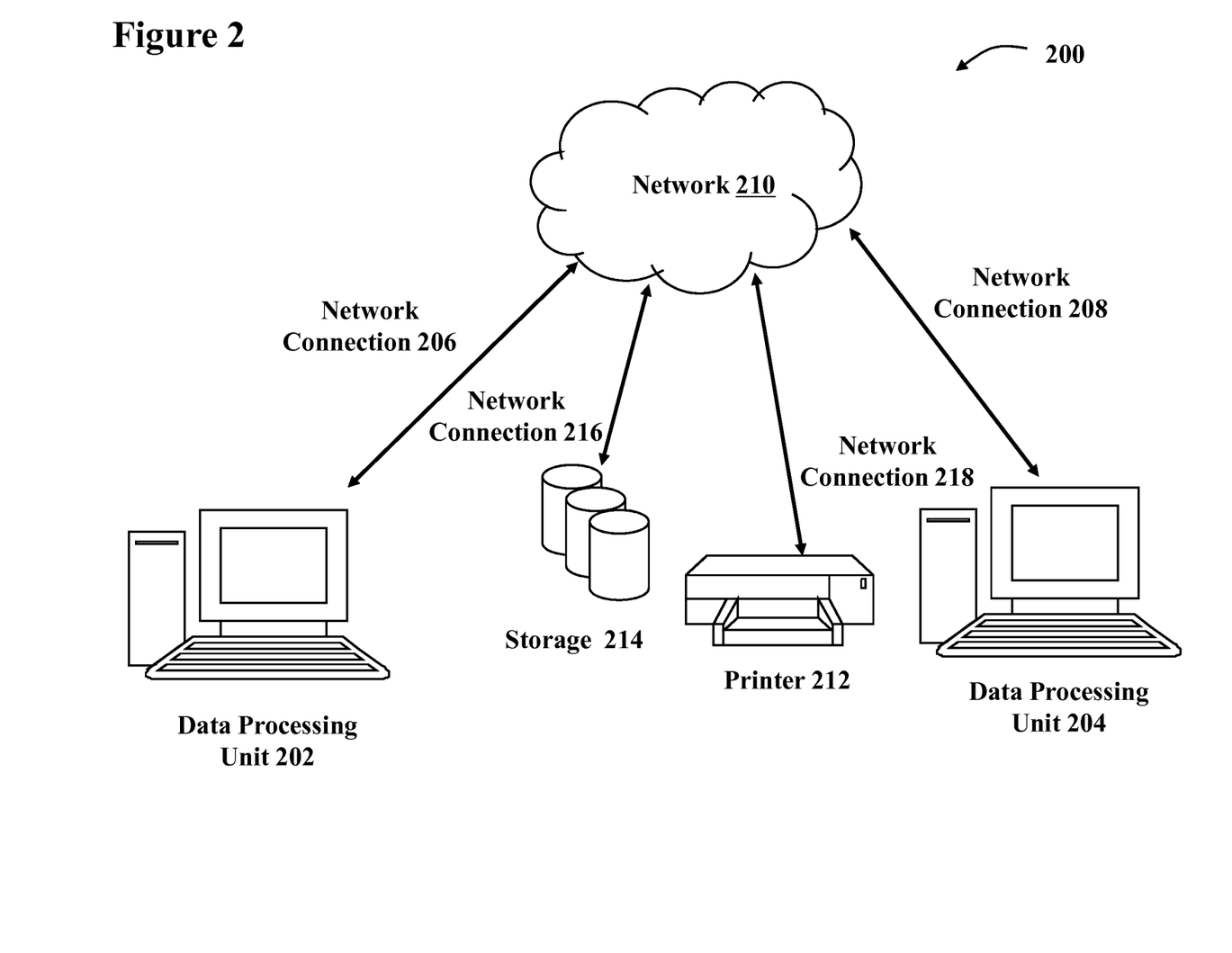
FIG. 2 shows a network for implementing an embodiment of the present invention.

FIG. 2 shows a network system 200 for implementing an embodiment of the present invention. Network system 200 may have a network 210 or group of interconnected computers, such as data processing units 202, 204, via network connections 206, 208 and may be of the type, e.g., a local area network (LAN) or internetwork. Printer 212 and storage 214 may be connected to network 210 via network connections 216, 218. Basic network components may include network interface cards, repeaters, hubs, bridges, switches and routers. Data processing units 202, 204 may be computers such as web servers or personal computers, or other user agents. A web server generally has hardware and software that are responsible for accepting HTTP requests from clients (user agents such as web browsers), and serving them HTTP responses along with optional data contents, which usually are web pages such as HTML documents and linked objects (images, etc.). In this document, the term "web browser" is used but any application for retrieving, presenting, and traversing information resources on the Internet must be considered.

Figure 3:
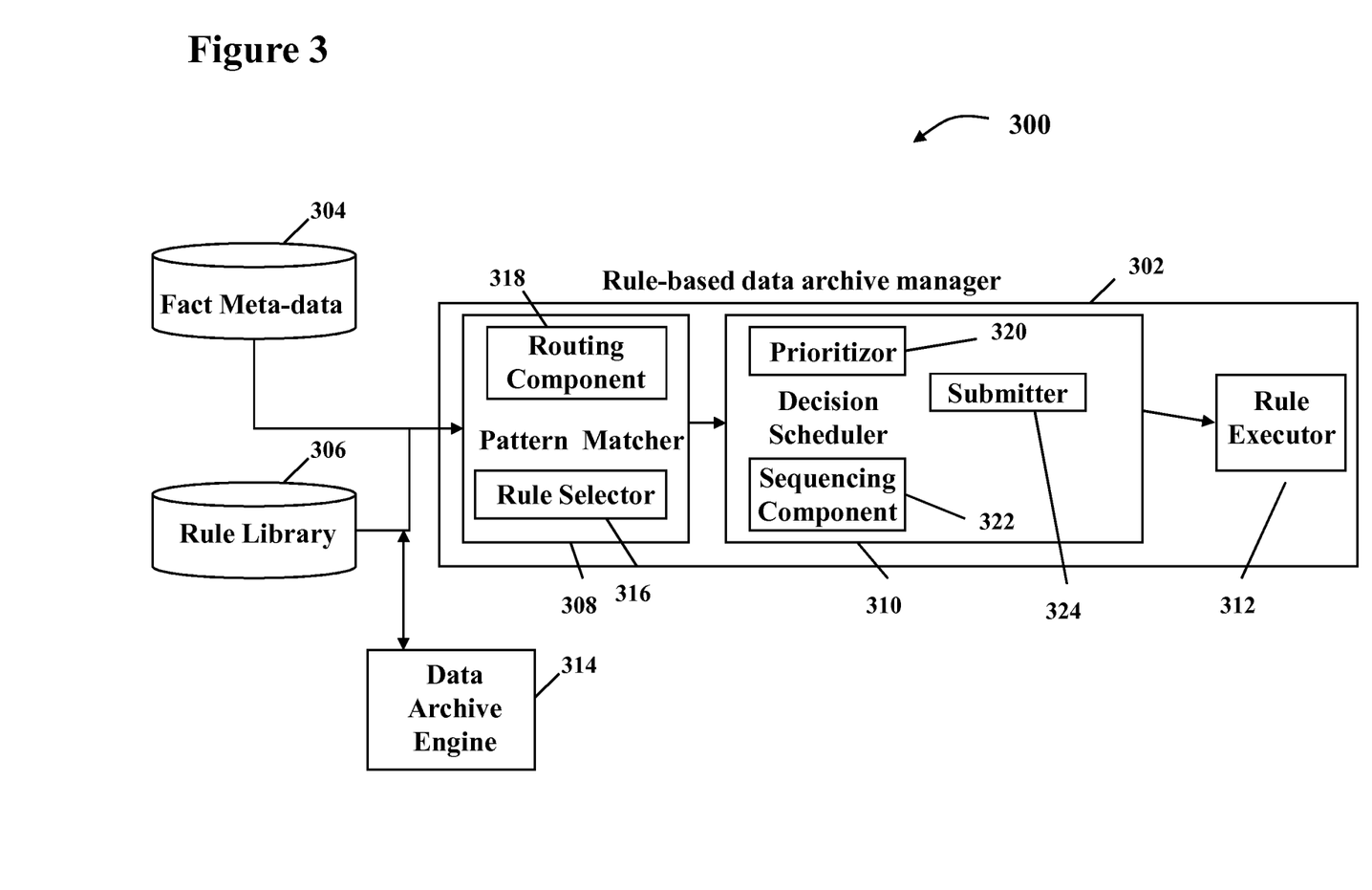
FIG. 3 illustrates an embodiment of a system of the present invention.

FIG. 3 illustrates a rule based data archive manager 302 in a computer system 300 having a fact meta-data database 304 and a rule library database 306. Rule based data archive manager 302 may have a pattern matcher 308 that may have program instructions to pattern match based upon rules in a rule based data archive manager having a pattern matcher, a decision scheduler 310 that may have program instructions to schedule decisions and a rule executor 312 that may have program instructions to execute rules. Pattern matcher 308, decision scheduler 310 and rule executor 312 constitute the rule-based data archive manager 302 of the generic data archive framework.

Pattern matcher 308 is responsible for the rule selection based on input data in the rule library storage 306 and routing the matched rules to decision scheduler 310. Decision scheduler 310 prioritizes all the matched rules based on facts stored in fact meta-data storage 304 and may have program instructions to store meta-data facts in the fact meta-data storage, and then submits them (via submitter 324) to rule executor 312 in sequence. Submitter 324 may have program instructions to submit the matched rules to the rule executor in sequence. Rule executor 312 completes data archive tasks via data archive engine 314 in terms of rule definition and may have program instructions to select rules based on the rules in the rule library storage. Rule executor 312 may have program instructions to store user input data about rules in the rule library storage and program instructions to match the rules with the facts and program instructions to route matched rules to the decision scheduler. Using a pattern- and rule-based data archive manager (module) 302, users only need to define rules and facts based on business requirements and may have program instructions to prioritize the matched rules based upon facts stored in fact meta-data storage. A generic data archive framework provides generic rule templates and fact description templates for users. The framework may have program instructions to archive data in terms of rule definition.

The benefits of using pattern- and rule-based data archive manager may be as follows:

it may provide template and rule-based approach can handle changing business requirements and regulations;

it may provide fine-grained rules allows accurate and complex rule specifications;

it may be flexible and adoptable;

no programming may be required and may be based on patterns and rules, users only need to complete the data archive configuration and use the generic data archive framework to implement a data achieve application for their enterprise applications; and it may mitigate risks for regulatory compliance.

Figure 4:
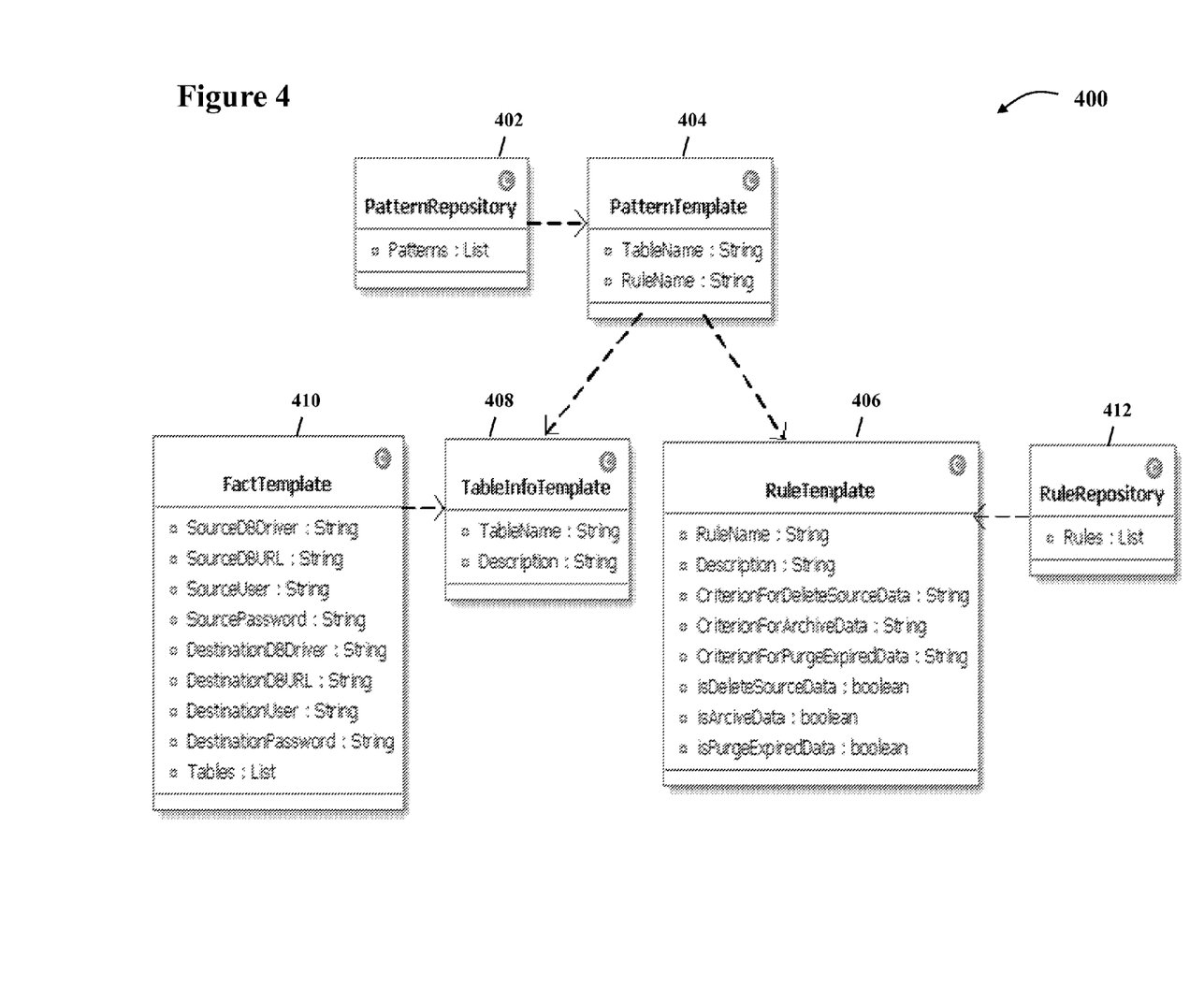
FIG. 4 illustrates a method for implementing the system and method of the present invention.

A data relationship diagram (shown in FIG. 4) for rule configuration in the framework includes rule data, fact data and pattern data. Rule data consists of rule template 406 (RuleTemplate) and rule repository 412 (RuleRepository). Rule template 406 includes filter conditions and criteria of original data (RuleName, Description, etc.), archive data (is ArchiveData) and out-of-date data. Rule template 406 also contains flags of whether or not removing original data (CriterionForDeletedSourceData), archiving data (CriterionForArchiveData) and purge out-of-date data (IsPurgeExpiredDate). Rule repository 412 consists of sets of data archive rules. Pattern matcher queries and matches rules through obtaining the handle of the rule repository 412. Fact data consists of table information template 408 (TableInfoTemplate) and fact template 410 (FactTemplate). Table information template 408 includes two pieces of key information, which is table name and table description. Fact template 410 defines information about data source and data destination, and a set of specific table information. Pattern matcher (308 from FIG. 3) retrieves fact data through fact template 410. Pattern template 404 consists of pattern template (PatternTemplate) and pattern repository 402 (PatternRepository). Pattern template 404 defines the relationship between fact data and rules. Pattern matcher 308 attaches corresponding data archive rules to specific data needed archiving in terms of the relationship, and then sends the corresponding information to decision scheduler 310. Decision scheduler 310 prioritizes the rule tasks and submits them to rule tasks to rule executor 312 for actual archive operation. Pattern repository 402 consists of a set of patterns. Pattern matcher 308 retrieves corresponding patterns through the handle of pattern repository 402.

Figure 5:
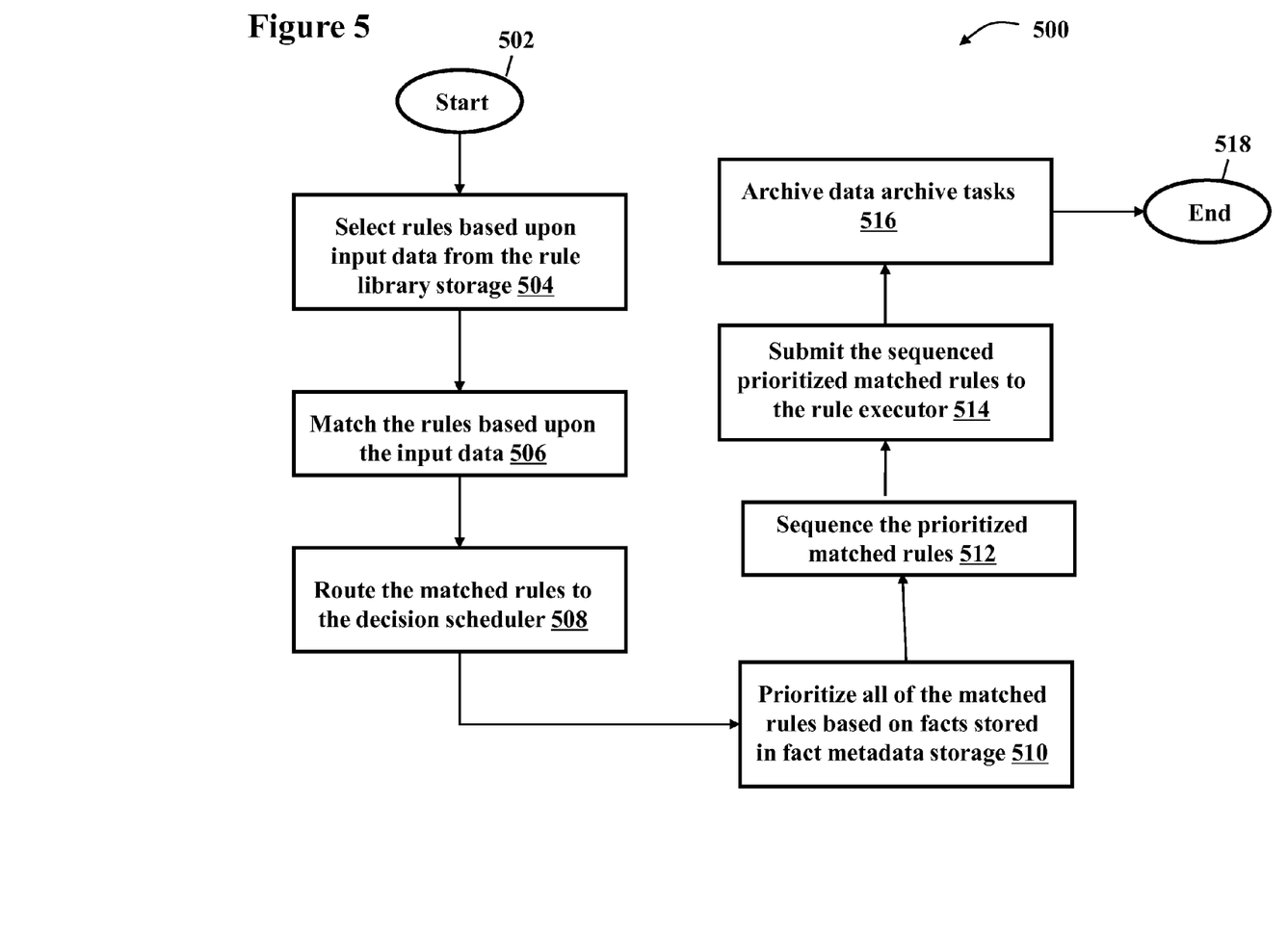
FIG. 5 illustrates another embodiment of the method of the present invention.

FIG. 5 illustrates an embodiment of a method 500 of the present invention that starts at 502. At 504, rules may be selected based upon input data from the rule library storage. At 506, rules are matched based upon the input data from the rule library storage. At 508, the matched rules are routed to the decision scheduler. At 510, all of the matched rules are prioritized based on facts stored in fact meta-data storage. At 512, the prioritized matched rules are sequenced. At 514, the sequenced prioritized matched rules are submitted to the rule executor. At 516, data archive tasks are being archived and ends at 518.

Figure 6:
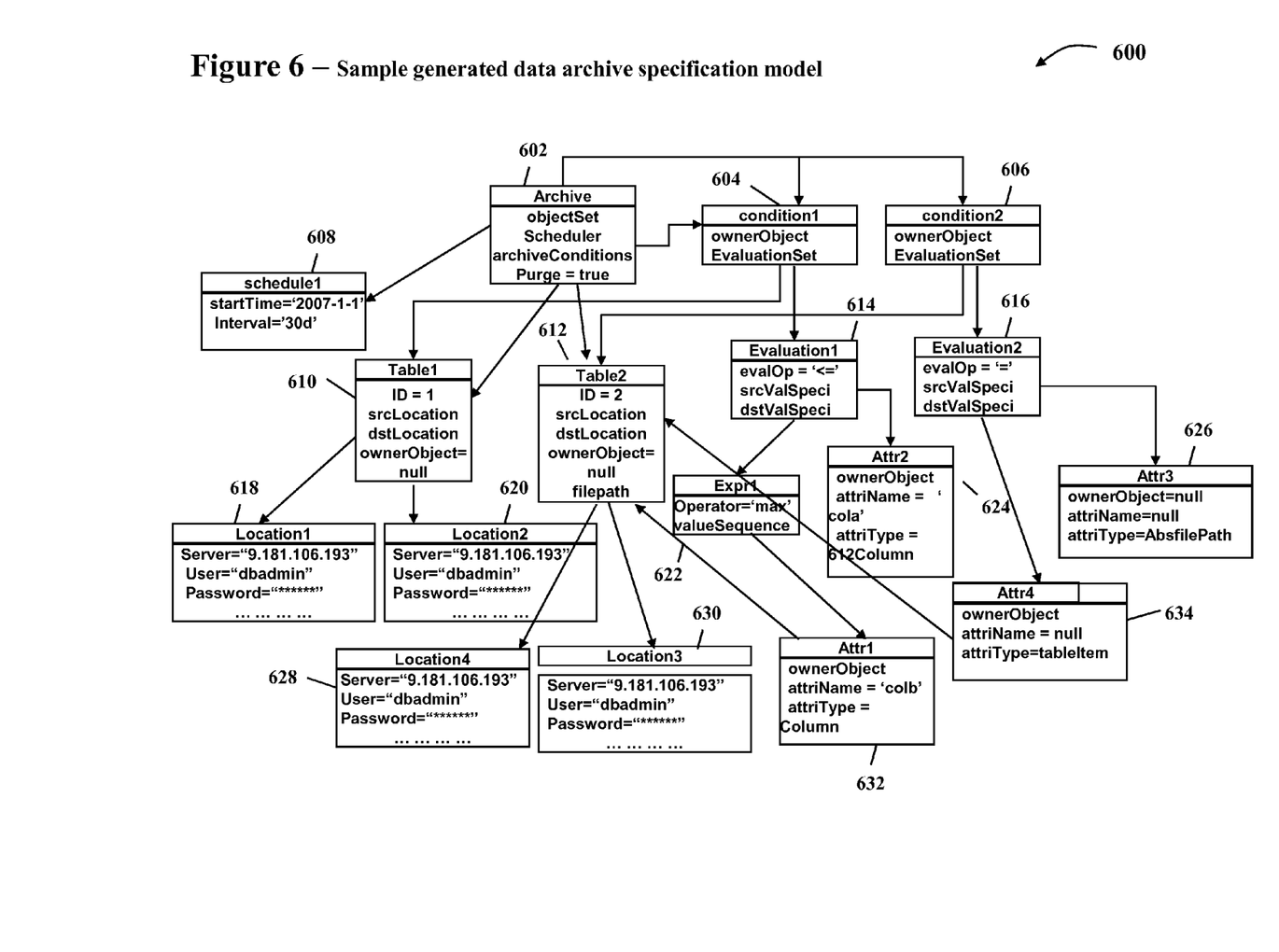
FIG. 6 illustrates a sample generated data archive specification model.

FIG. 6 illustrates a simple but typical scenario 600 to demonstrate the process of capturing rules while archive multi-tables and files with corresponding relationships. There are 3 objects that need to be archived in this scenario: Table1 610 and Table2 612 are stored in a relational database; file1 may be stored in a file system such as in a system of FIG. 1. The file1 may be a type of files from business perspective, e.g., a set of audit trail log files. Table2 612 contains the absolute file path of file1.

Below are the archive requirements, which are business rules:
  1. all data in Table2 612 should be archived periodically;
  2. only those records in Table1 610 can be archived, the value of which in the field "cola" (Attr2 624, attriName='cola'), are no less than the maximum value of the field "colb" (Attr1 632, attriName='colb') in Table2 612;
  3. the information of database management system (DBMS) for Table1 610 and Table2 612 in Location 1 618, Location 2 620, Location 3 630, Location 4 628 as follows:
    Server: 9.181.106.193:9001; and
    User/Password: dbadmin/dbadmin
  4. file1 should be archived, once an absolute file path appears in a record of the field "filepath" of Table2 612; and
  5. all data may be archived once every "30 days" periodically after "2007-01-01" as shown in schedule1 608.

The generated data archive specification model in FIG. 6 reflects business rules.

"Objectset" as in Archive element 602 is used to represent data to be archived. It contains all necessary information and attributes to describe data;

"ArchiveConditions" (as in archive element 602 and its reference elements contain the attributes to model data selection) conditions in archive element 602.

"Schedule" (as in schedule1 608) defines when to perform data archive behavior.

"Location" (Location 1 618, Location 2 620, Location 3 630, Location 4 628) is to model the data source and archive repository and model where to perform data archive.

"Archive" 602 is the root element of this meta-model. It represents a data archive application. It refers to all to-be archived data, the archive rules (i.e., schedule and conditions). The archive behavior is directed to be "purge", i.e., del. and "Schedule1: start time is "2007-01-01" at schedule 608; interval is every 30 days.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for flexible data archival using a model-driven approach, the method comprising:
  a computer system pattern-matching input data against a set of stored rules that define a set of archive conditions that contain attributes to model data selection and an archive schedule that defines when to perform a data archive behavior, wherein the input data comprises a set of archive requirements and a set of facts about archive data, wherein the set of archive requirements and the set of facts about archive data are based on business requirements of an enterprise application, and wherein the set of facts about archive data is stored in meta-data;
  the computer system selecting one or more rules from the set of stored rules based on a result of the pattern-matching of the input data against the set of stored rules;
  the computer system prioritizing the selected one or more rules from the set of stored rules based on the set of facts about archive data;
  the computer system routing the selected one or more rules from the set of stored rules to a scheduler;

the computer system submitting the selected one or more rules from the set of stored rules to a rule executor; and the computer system archiving data archive tasks based upon the selected one or more rules from the set of stored rules.

2. The method as defined in claim 1 further comprising:

the computer system matching the selected one or more rules from the set of stored rules with one or more facts of the set of facts about archive data; and the computer system submitting the matched one or more rules from the set of stored rules to the scheduler.

3. The method as defined in claim 1 further comprising:

the computer system sequencing the prioritized one or more rules from the set of stored rules; and wherein the submitting comprises submitting, to the rule executor, the sequenced and prioritized set of rules.

4. The method as defined in claim 3 further comprising the computer system archiving data archive tasks based upon the prioritized one or more rules from the set of rules and the input data.

5. A computer system for flexible data archival using a model-driven approach, the computer system comprising:

a CPU, a computer readable memory and a computer readable storage media;

program instructions, stored on the computer readable storage media for execution by the CPU via the computer readable memory, to pattern match input data against a set of stored rules that define a set of archive conditions that contain attributes to model data selection and an archive schedule that defines when to perform a data archive behavior, wherein the input data comprises a set of archive requirements and a set of facts about archive data, wherein the set of archive requirements and the set of facts about archive data are based on business requirements of an enterprise application, and wherein the set of facts about archive data is stored in meta-data;

program instructions, stored on the computer readable storage media for execution by the CPU via the computer readable memory, to select one or more rules from the set of stored rules based on a result of pattern matching the input data against the set of stored rules;

program instructions, stored on the computer readable storage media for execution by the CPU via the computer readable memory, to prioritize the selected one or more rules from the set of stored rules based on the set of facts about archive data;

program instructions, stored on the computer readable storage media for execution by the CPU via the computer readable memory, to execute the selected one or more rules from the set of stored rules;

program instructions, stored on the computer readable storage media for execution by the CPU via the computer readable memory, to store meta-data facts in a storage; and program instructions, stored on the computer readable storage media for execution by the CPU via the computer readable memory, to store the input data in a storage.

6. The system as defined in claim 5 further comprising program instructions, stored on the computer readable storage media for execution by the CPU via the computer readable memory, to match the selected one or more rules from the set of stored rules with one or more facts of the set of facts about archive data; and program instructions, stored on the computer readable storage media for execution by the CPU via the computer readable memory, to route, to a scheduler, the matched one or more rules from the set of stored rules matched with the one or more facts of the set of facts about archive data.

7. The system as defined in claim 6 further comprising program instructions, stored on the computer readable storage media for execution by the CPU via the computer readable memory, to prioritize, based upon facts stored in meta-data, the one or more rules from the set of stored rules matched with the one or more facts of the set of facts about archive data.

8. The system as defined in claim 7 further comprising program instructions, stored on the computer readable storage media for execution by the CPU via the computer readable memory, to submit, to a rule executor, in sequence, the prioritized one or more rules from the set of stored rules matched with the one or more facts of the set of facts about archive data.

9. The system as defined in claim 6 further comprising program instructions, stored on the computer readable storage media for execution by the CPU via the computer readable memory, to archive data archive tasks of the input data based on the selected one or more rules from the set of stored rules matched with the one or more facts of the set of facts about archive data.

10. A computer program product for flexible data archival, the computer program product comprising:

a computer readable storage device storing computer program instructions, the computer program instructions being executable by a computer system, the computer program instructions including:

program instructions to pattern-match input data against a set of stored rules that define a set of archive conditions that contain attributes to model data selection and an archive schedule that defines when to perform a data archive behavior, wherein the input data comprises a set of archive requirements and a set of facts about archive data, wherein the set of archive requirements and the set of facts about archive data are based on business requirements of an enterprise application, and wherein the set of facts about archive data is stored in meta-data;

program instructions to select one or more rules from the set of stored rules based on a result of pattern-matching the input data against the set of stored rules;

program instructions to prioritize the selected one or more rules from the set of stored rules based on the set of facts about archive data;

program instructions to route the selected one or more rules from the set of stored rules to a scheduler;

program instructions to submit the selected one or more rules from the set of stored rules to a rule executor; and program instructions to archive data archive tasks based upon the selected one or more rules from the set of stored rules.

11. The computer program product as defined in claim 10 wherein the stored computer program instructions further include:

program instructions to match the selected one or more rules from the set of stored rules with one or more facts of the set of facts about archive data; and program instructions to submit the matched one or more rules from the set of stored rules to the scheduler.

12. The computer program product as defined in claim 10 wherein the stored computer program instructions further include:

program instructions to sequence the prioritized one or more rules from the set of stored rules prioritized based on the set of facts about archive data stored in meta-data; and wherein the program instructions to submit comprise program instructions to submit, to the rule executor, the sequenced and prioritized set of stored rules.

13. A method comprising a computing system integrating computer-readable code, wherein the code in combination with the computing system is capable of performing a process for archiving data, the process comprising:

pattern-matching input data against a set of stored rules that define a set of archive conditions that contain attributes to model data selection and an archive schedule that defines when to perform a data archive behavior, wherein the input data comprises a set of archive requirements and a set of facts about archive data, wherein the set of archive requirements and the set of facts about archive data are based on business requirements of an enterprise application, and wherein the set of facts about archive data is stored in meta-data;

selecting one or more rules from the set of stored rules based on a result of the pattern-matching of the input data against the set of stored rules;

prioritizing the selected one or more rules from the set of stored rules based on the set of facts about archive data;

routing the selected one or more rules from the set of stored rules to a scheduler;

submitting the selected one or more rules from the set of stored rules to a rule executor; and archiving data archive tasks based upon the selected one or more rules from the set of stored rules.

14. The method as defined in claim 13 wherein the process further comprises:

matching the selected one or more rules from the set of stored rules with one or more facts of the set of facts about archive data; and submitting the matched one or more rules from the set of stored rules to the scheduler.

* * * * *